US011509547B2

(12) United States Patent
Mariotti et al.

(10) Patent No.: US 11,509,547 B2
(45) Date of Patent: Nov. 22, 2022

(54) METHOD AND SYSTEM FOR HANDLING SERVICE REQUESTS

(71) Applicant: JPMorgan Chase Bank, N.A., New York, NY (US)

(72) Inventors: Eugene Mariotti, Enfield (GB); Stephen John Young, Rutherglen (GB); Rohit Talreja, Hyderabad (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/229,128

(22) Filed: Apr. 13, 2021

(65) Prior Publication Data

US 2022/0321432 A1 Oct. 6, 2022

(30) Foreign Application Priority Data

Feb. 27, 2021 (IN) .............................. 202111008379

(51) Int. Cl.
*G06F 15/173* (2006.01)
*H04L 41/5074* (2022.01)
*H04L 41/5041* (2022.01)
*H04L 41/16* (2022.01)
*H04L 41/22* (2022.01)
*H04L 41/5022* (2022.01)

(52) U.S. Cl.
CPC .......... *H04L 41/5074* (2013.01); *H04L 41/16* (2013.01); *H04L 41/22* (2013.01); *H04L 41/5022* (2013.01); *H04L 41/5041* (2013.01)

(58) Field of Classification Search
CPC ..... H04L 41/5074; H04L 41/16; H04L 41/22; H04L 41/5022

USPC .......................... 709/223, 238, 244, 202, 203
See application file for complete search history.

(56) References Cited

U.S. PATENT DOCUMENTS

| 2003/0069797 A1* | 4/2003 | Harrison ........ G06Q 10/063112 |
| | | 705/7.21 |
| 2009/0310764 A1* | 12/2009 | Gerhart ..................... G06F 8/61 |
| | | 379/142.04 |
| 2010/0218192 A1 | 8/2010 | Dunn |

(Continued)

OTHER PUBLICATIONS

International Search Report and Written Opinion of the International Searching Authority in corresponding International Application No. PCT/US21/27026, dated Jul. 7, 2021.

*Primary Examiner* — Lan Dai T Truong
(74) *Attorney, Agent, or Firm* — Greenblum & Bernstein, P.L.C.

(57) ABSTRACT

A system and a method for facilitating a processing of a service request is provided. The method includes: accessing a plurality of previously received service requests; receiving a first new service request; determining a handling protocol for the first new service request; adding the received first new service request to the plurality of previously received service requests to generate an updated list of open service requests; and displaying a listing of a least a subset of the updated list of open service requests. The handling protocol includes a priority ranking of the first new service request and an identification of a proposed technician for resolving the corresponding problem. The determination of the handling protocol is performed by assigning weights to each of a set of predefined parameters and algorithmically combining the assigned weights to obtain an overall priority score.

18 Claims, 9 Drawing Sheets

(56) References Cited

U.S. PATENT DOCUMENTS

| | | | |
|---|---|---|---|
| 2012/0214443 A1* | 8/2012 | Daigle | H04L 9/3228 |
| | | | 455/411 |
| 2020/0027094 A1* | 1/2020 | Consalvo | H04L 41/0803 |
| 2020/0184407 A1* | 6/2020 | Mappus | G06N 20/20 |
| 2020/0258013 A1 | 8/2020 | Monnett et al. | |
| 2020/0265375 A1 | 8/2020 | Azad | |
| 2020/0389410 A1* | 12/2020 | Guim Bernat | H04L 47/6255 |

* cited by examiner

METHOD AND SYSTEM FOR HANDLING SERVICE REQUESTS

CROSS-REFERENCE TO RELATED APPLICATIONS

This application claims priority benefit from Indian Application No. 202111008379, filed Feb. 27, 2021, which is hereby incorporated by reference in its entirety.

BACKGROUND

Field of the Disclosure

This technology generally relates to methods and systems for handling service requests, and more particularly to methods and systems for expediting the prioritization and processing of service requests in order to reduce response time and increase efficiency in problem resolution.

Background Information

Today, many organizations conduct activities via the use of computer platforms and networks, and are heavily reliant upon those platforms and networks to operate at full capacity without interruption. In order to minimize system failures and disruptions, such organizations often employ information technology (IT) service technicians to respond to notifications that relate to potential and actual operational problems and issues.

In the case of a relatively large organization, the number of individual computer users may be quite large, e.g., in the thousands, tens of thousands, or hundreds of thousands. As such, the handling of notifications of IT problems and issues (also referred to herein as "tickets") typically requires initial determinations as to priority and/or urgency to resolve the problem and also as to the most efficient way to address the problem. Further, the number of tickets may be so large that the process for making these determinations is itself quite cumbersome.

Accordingly, there is a need for a method and system for expediting the prioritization and processing of IT service requests in order to reduce response time and increase efficiency in overall problem resolution.

SUMMARY

The present disclosure, through one or more of its various aspects, embodiments, and/or specific features or sub-components, provides, inter alia, various systems, servers, devices, methods, media, programs, and platforms for expediting the prioritization and processing of information technology service requests in order to reduce response time and increase efficiency in problem resolution.

According to an aspect of the present disclosure, a method for facilitating a processing of a service request is provided. The method is implemented by at least one processor. The method includes accessing, by the at least one processor, a plurality of previously received service requests; receiving, by the at least one processor, a first new service request; determining, by the at least one processor, a handling protocol for the first new service request; adding the received first new service request to the plurality of previously received service requests to generate an updated list of open service requests; and displaying, via a graphical user interface, a listing of a least a subset of the updated list of open service requests. The handling protocol includes a priority ranking of the first new service request and an identification of at least one technician that is proposed for resolving a problem that relates to the first new service request.

The determining of the handling protocol for the first new service request may include: assigning a respective weight to each of a plurality of predetermined parameters with respect to the first new service request; and combining the assigned weights to obtain an overall priority score.

The combining of the assigned weights may include applying an algorithm to the assigned weights and obtaining the overall priority score as an output of the applying of the algorithm.

The algorithm may be trained by using a machine learning technique with respect to historical service request handling data.

The determining of the handling protocol may further include determining the identification of the at least one technician that is proposed for resolving the problem based at least in part on a geographical location of the technician with respect to a geographic location of an origination source of the first new service request.

The at least one technician may include at least two technicians that are proposed for solving the problem. The handling protocol may include an ordered list of the at least two technicians that indicates which of the at least two technicians is a first choice and which of the at least two technicians is a second choice.

The displaying of the listing of a least a subset of the updated list of open service requests may include displaying, for each item in the updated list, information that relates to a priority of the item, an elapsed amount of time since the item was originally received, a description of a problem, and a user name that relates to an origination source of the item.

The method may further include receiving, via the graphical user interface, a user input for requesting information that relates to an origination source of a selected item, the request, and displaying, on the graphical user interface, information that relates to a user name that relates to the origination source of the selected item, contact information that relates to the origination source of the selected item, and a description of a problem that relates to the selected item.

The method may further include displaying, on the graphical user interface, a user status that relates to the origination source of the selected item. The user status may include at least one from among an online status, an away status, and a busy status.

The method may further include displaying, on the graphical user interface, a message that indicates a number of unassigned service requests in a queue that corresponds to a predetermined team of technicians.

According to another exemplary embodiment, a computing apparatus for facilitating a processing of a service request includes a processor; a memory; and a communication interface coupled to each of the processor and the memory. The processor is configured to: access a plurality of previously received service requests; receive, via the communication interface, a first new service request; determine a handling protocol for the first new service request; add the received first new service request to the plurality of previously received service requests to generate an updated list of open service requests; and display, via a graphical user interface, a listing of a least a subset of the updated list of open service requests. The handling protocol includes a priority ranking of the first new service request and an identification of at least one technician that is proposed for resolving a problem that relates to the first new service request.

The processor may be further configured to determine the handling protocol for the first new service request by: assigning a respective weight to each of a plurality of predetermined parameters with respect to the first new service request; and combining the assigned weights to obtain an overall priority score.

The processor may be further configured to apply an algorithm to the assigned weights and to obtain the overall priority score as an output of the application of the algorithm.

The algorithm may be trained by using a machine learning technique with respect to historical service request handling data.

The processor may be further configured to determine the identification of the at least one technician that is proposed for resolving the problem based at least in part on a geographical location of the technician with respect to a geographic location of an origination source of the first new service request.

The at least one technician may include at least two technicians that are proposed for solving the problem. The handling protocol may include an ordered list of the at least two technicians that indicates which of the at least two technicians is a first choice and which of the at least two technicians is a second choice.

The processor may be further configured to display, on the graphical user interface, for each item in the updated list, information that relates to a priority of the item, an elapsed amount of time since the item was originally received, a description of a problem, and a user name that relates to an origination source of the item.

The processor may be further configured to receive, via the graphical user interface, a user input for requesting information that relates to an origination source of a selected item, the request, and to display, on the user interface, information that relates to a user name that relates to the origination source of the selected item, contact information that relates to the origination source of the selected item, and a description of a problem that relates to the selected item.

The processor may be further configured to display, on the graphical user interface, a user status that relates to the origination source of the selected item. The user status may include at least one from among an online status, an away status, and a busy status.

The processor may be further configured to display, on the graphical user interface, a message that indicates a number of unassigned service requests in a queue that corresponds to a predetermined team of technicians.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
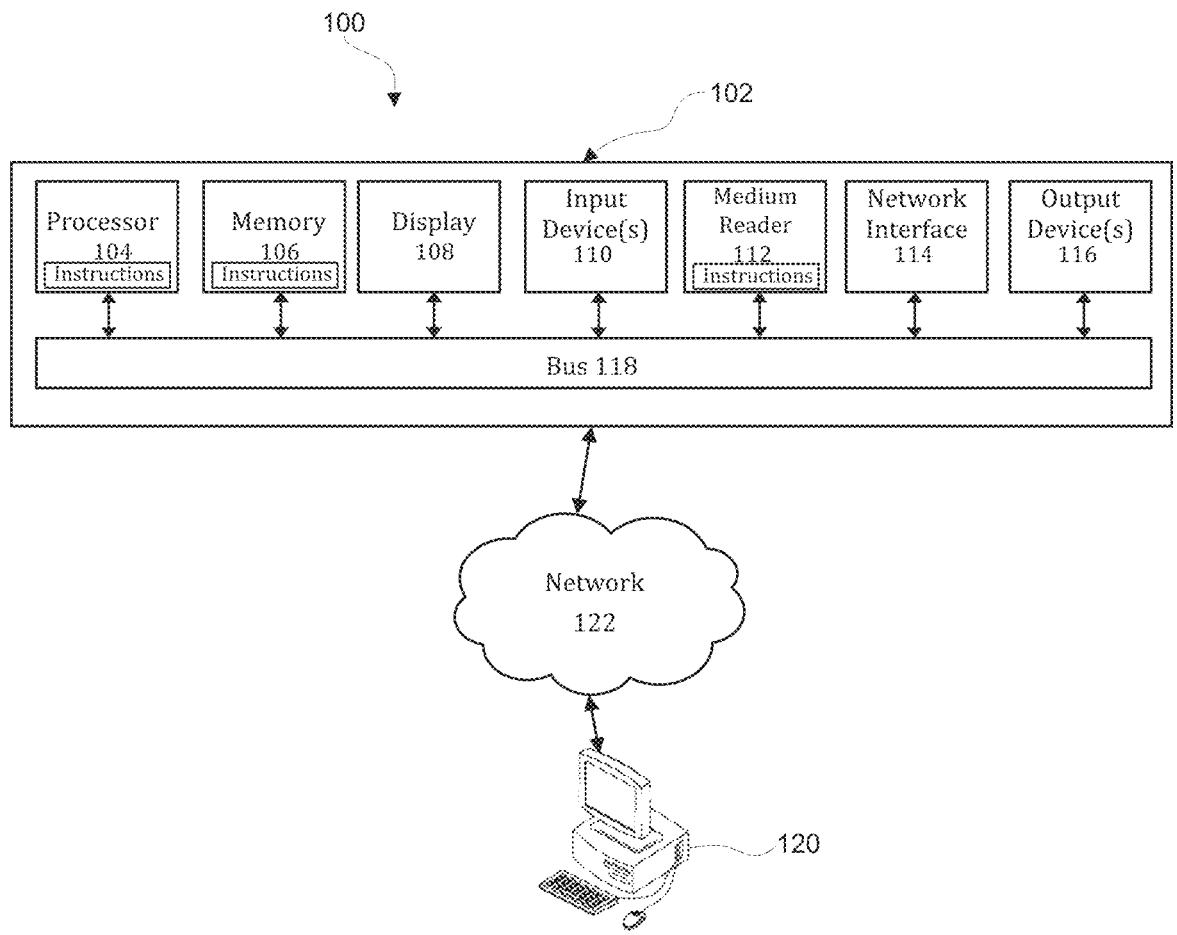
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for expediting the prioritization and processing of service requests in order to reduce response time and increase efficiency in problem resolution.

Figure 2:
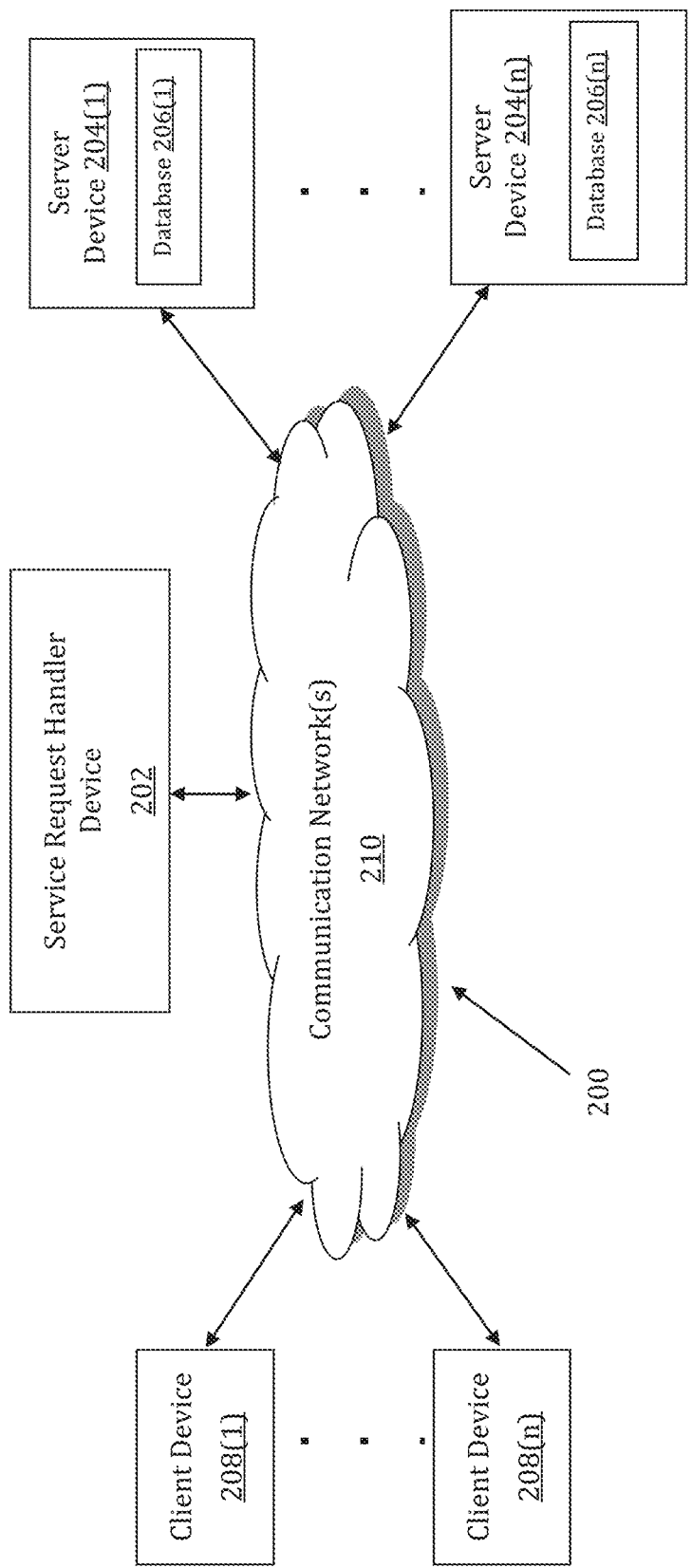
FIG. 2 illustrates an exemplary diagram of a network environment.

Referring to FIG. 2, a schematic of an exemplary network environment 200 for implementing a method for expediting the prioritization and processing of service requests in order to reduce response time and increase efficiency in problem resolution is illustrated. In an exemplary embodiment, the method is executable on any networked computer platform, such as, for example, a personal computer (PC).

The method for expediting the prioritization and processing of service requests in order to reduce response time and increase efficiency in problem resolution may be implemented by a Service Request Handler (SRH) device 202. The SRH device 202 may be the same or similar to the computer system 102 as described with respect to FIG. 1. The SRH device 202 may store one or more applications that can include executable instructions that, when executed by the SRH device 202, cause the SRH device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SRH device 202 itself, may be located in virtual server(s) running in a cloud-based computing environment rather than being tied to one or more specific physical network computing devices. Also, the application(s) may be running in one or more virtual machines (VMs) executing on the SRH device 202. Additionally, in one or more embodiments of this technology, virtual machine(s) running on the SRH device 202 may be managed or supervised by a hypervisor.

In the network environment 200 of FIG. 2, the SRH device 202 is coupled to a plurality of server devices 204(1)-204(n) that hosts a plurality of databases 206(1)-206(n), and also to a plurality of client devices 208(1)-208(n) via communication network(s) 210. A communication interface of the SRH device 202, such as the network interface 114 of the computer system 102 of FIG. 1, operatively couples and communicates between the SRH device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SRH device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and SRH devices that efficiently implement a method for expediting the prioritization and processing of service requests in order to reduce response time and increase efficiency in problem resolution.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SRH device 202 may be a standalone device or integrated with one or more other devices or apparatuses, such as one or more of the server devices 204(1)-204(n), for example. In one particular example, the SRH device 202 may include or be hosted by one of the server devices 204(1)-204(n), and other arrangements are also possible. Moreover, one or more of the devices of the SRH device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the SRH device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to service request status, historical service request information, and user information.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the SRH device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the SRH device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the SRH device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SRH device 202, the server devices 204(1)-204(n), or the client devices 208(1)-208(n), for example, may be configured to operate as virtual instances on the same physical machine. In other words, one or more of the SRH device 202, the server devices 204(1)-204(n), or the client devices 208(1)-208(n) may operate on the same physical device rather than as separate devices communicating through communication network(s) 210. Additionally, there may be more or fewer SRH devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
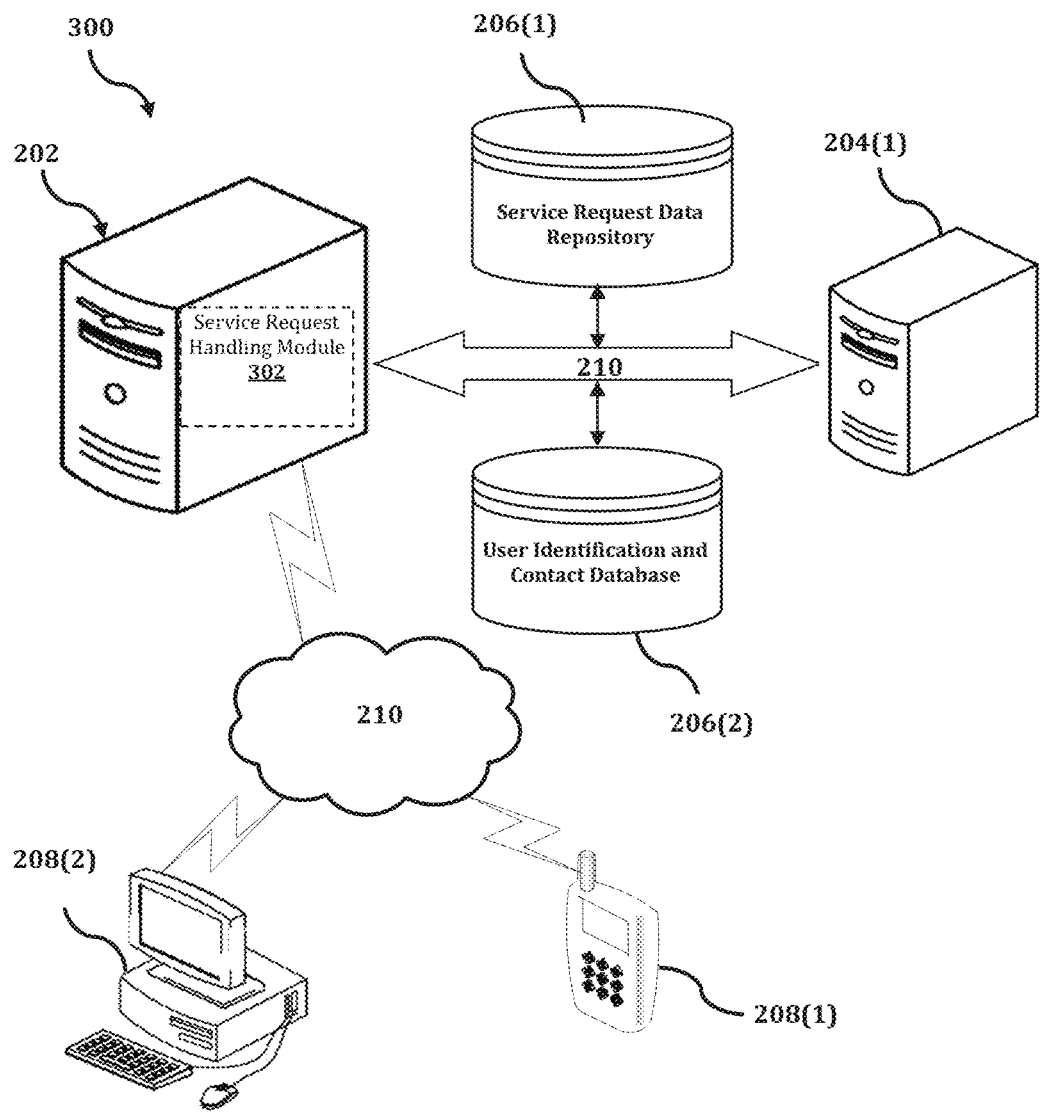
FIG. 3 shows an exemplary system for implementing a method for expediting the prioritization and processing of service requests in order to reduce response time and increase efficiency in problem resolution.

The SRH device 202 is described and illustrated in FIG. 3 as including a service request handling module 302, although it may include other rules, policies, modules, databases, or applications, for example. As will be described below, the service request handling module 302 is configured to implement a method for expediting the prioritization and processing of service requests in order to reduce response time and increase efficiency in problem resolution.

An exemplary process 300 for implementing a mechanism for expediting the prioritization and processing of service requests in order to reduce response time and increase efficiency in problem resolution by utilizing the network environment of FIG. 2 is illustrated as being executed in FIG. 3. Specifically, a first client device 208(1) and a second client device 208(2) are illustrated as being in communication with SRH device 202. In this regard, the first client device 208(1) and the second client device 208(2) may be "clients" of the SRH device 202 and are described herein as such. Nevertheless, it is to be known and understood that the first client device 208(1) and/or the second client device 208(2) need not necessarily be "clients" of the SRH device 202, or any entity described in association therewith herein. Any additional or alternative relationship may exist between either or both of the first client device 208(1) and the second client device 208(2) and the SRH device 202, or no relationship may exist.

Further, SRH device 202 is illustrated as being able to access a service request data repository 206(1) and a user identification and contact database 206(2). The service request handling module 302 may be configured to access these databases for implementing a method for expediting the prioritization and processing of service requests in order to reduce response time and increase efficiency in problem resolution.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the SRH device 202 via broadband or cellular communication. Of course, these embodiments are merely exemplary and are not limiting or exhaustive.

Upon being started, the service request handling module 302 executes a process for expediting the prioritization and processing of service requests in order to reduce response time and increase efficiency in problem resolution. An exemplary process for expediting the prioritization and processing of service requests in order to reduce response time and increase efficiency in problem resolution is generally indicated at flowchart 400 in FIG. 4.

Figure 4:
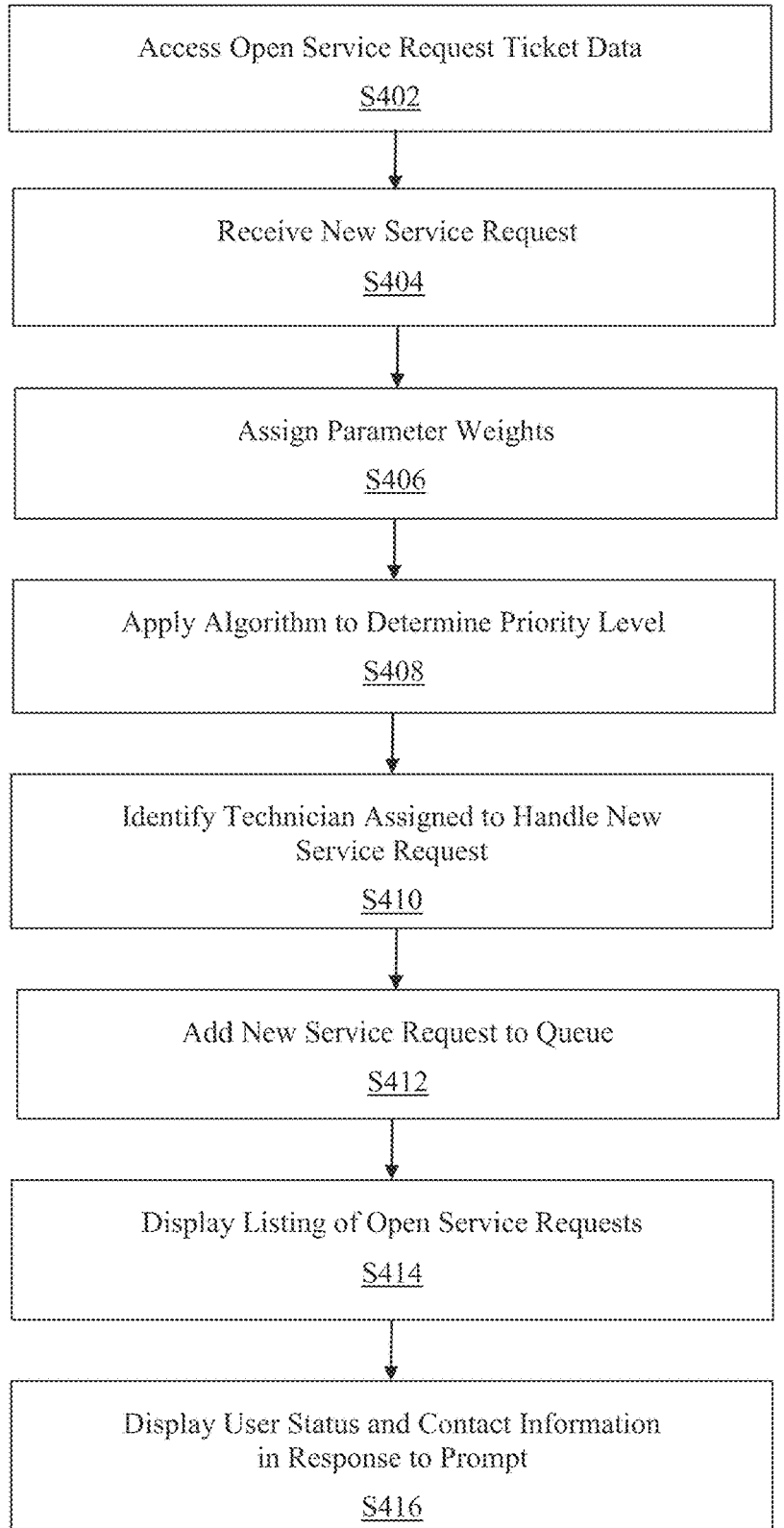
FIG. 4 is a flowchart of an exemplary process for implementing a method for expediting the prioritization and processing of service requests in order to reduce response time and increase efficiency in problem resolution.

In process 400 of FIG. 4, at step S402, a list of open service request tickets is accessed. In an exemplary embodiment, a technician that is tasked with handling and processing requests to resolve service problems, such as, for example, an information technology (IT) service technician that handles IT service requests, accesses a list of open tickets. The list of open tickets provides data that relates to each service request, including an identification of a user that corresponds to the source of the service request, an identifier such as a ticket identification number, an elapsed amount of time since the ticket was originated, a priority level indication, a current status, and a brief description of a problem that requires resolution.

At step S404, a new service request is received. Then, at step S406, the service request handling module 302 initiates a processing of the newly received ticket by assigning a set of weights to parameters that correspond to various pieces of data included in the ticket, and by applying an algorithm at step S408 to combine the weighted parameters in order to determine a priority level of the newly received ticket. In an exemplary embodiment, the priority level may be determined as being equivalent to a relative ranking level, such as "High", "Medium", or "Low". In another exemplary embodiment, the priority level may be determined as a numerical score on a predetermined scale, such as, for example, a scale having a range of one (1) to ten (10), where 1 is deemed as the highest priority and 10 is deemed as the lowest priority.

In an exemplary embodiment, the application of an algorithm at step S408 may include using a machine learning technique to incorporate historical service request handling data into the algorithm, in order to improve a quality of a result of the algorithm.

At step S410, the service request handling module 302 identifies a technician to be assigned for handling the newly received service request. In an exemplary embodiment, the identification of a technician may be based on several factors, such as, for example, the geographical location of the user that is the source of the service request, the geographical location of candidate technicians, information that relates to whether or not the problem is resolvable remotely, and the determined priority level of the new ticket.

In an exemplary embodiment, the identification of a technician may include an ordered list of two or more technicians, such as, for example, a list of five technicians within which the first listed technician is indicated as being the first choice, and if the first listed technician is unavailable, then the second listed technician is indicated as the second choice, and so forth. In this manner, the process 400 includes redundancy to ensure that service requests are expeditiously assigned to a technician even when a particular technician is not immediately available.

At step S412, the newly received service request ticket is added to the queue of existing open service requests. Then, at step S414, the updated listing of open service requests is displayable. In this manner, when an IT technician initiates the process 400 by logging onto his system, the accessing of open service request ticket data of step S402 includes up-to-date information about the newly received ticket, together with the relevant information that had previously been accessible.

In an exemplary embodiment, the displaying of an updated listing includes only a subset of the entire list of open tickets. The number of open tickets that is displayed may be based on the number of tickets that are open at any given time and a predetermined maximum number of tickets that displayable on a computer screen. In this aspect, the listing may be scrollable and/or may enable a user to display respective pages that show different subsets of the list of open service tickets.

At step S416, user status information and user contact information is displayed in response to a prompt. In an exemplary embodiment, when the updated listing of open tickets is displayed at step S414, each item in the list includes an accompanying clickable button that enables an IT technician to prompt the service request handling module 302 to display user status information and user contact information that relates to the origination source of the service request. In this manner, the IT technician is able to efficiently assess the current status of the ticket and also to communicate with the user to obtain further information about the problem as necessary and then to inform the user as to steps being taken to resolve the problem.

Figure 5:
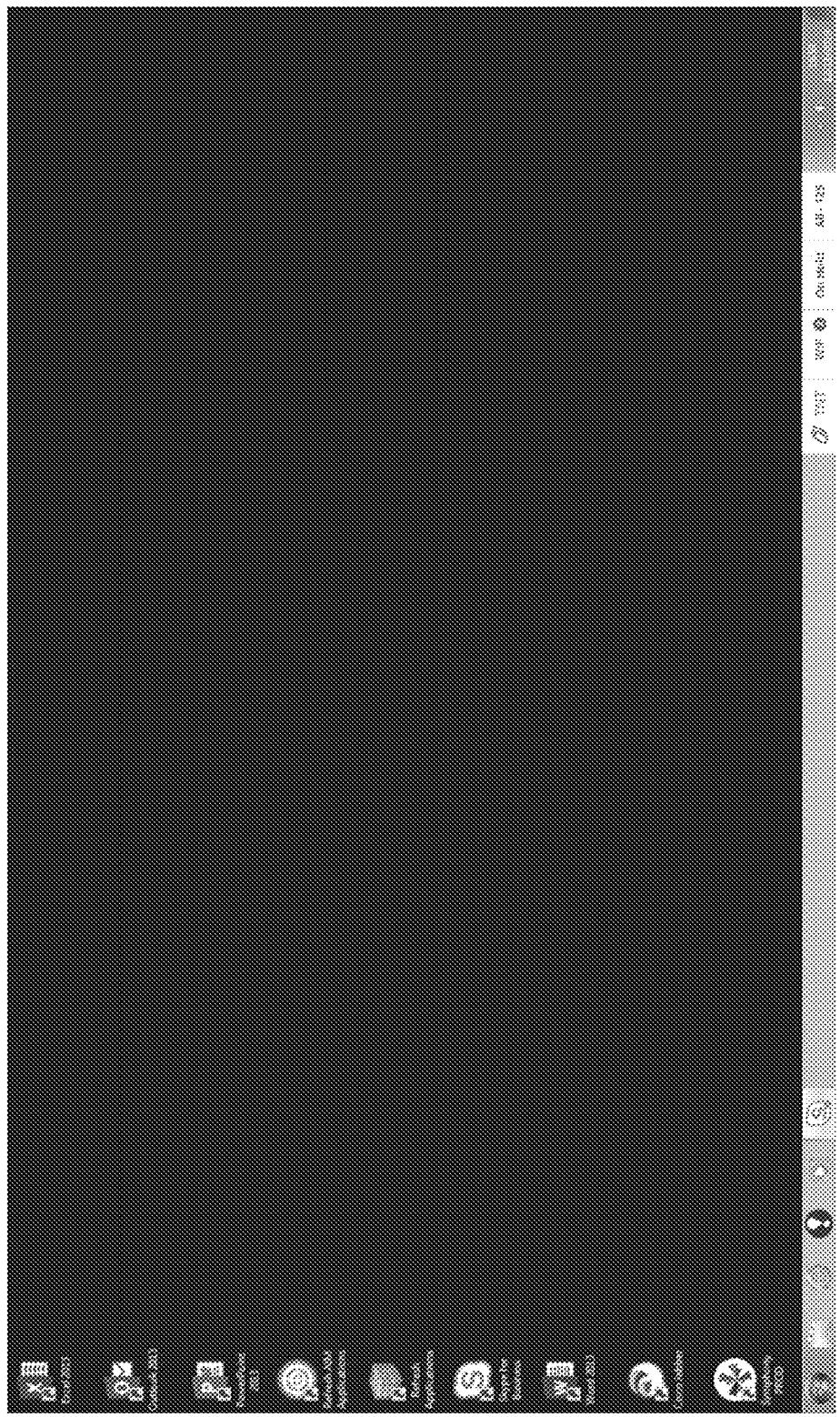
FIG. 5 is a first screen shot of a graphical user interface that facilitates an execution of an exemplary method for expediting the prioritization and processing of service requests in order to reduce response time and increase efficiency in problem resolution.

FIG. 5 is a first screen shot 500 of a graphical user interface (GUI) that facilitates an execution of an exemplary method for expediting the prioritization and processing of service requests in order to reduce response time and increase efficiency in problem resolution. In the screen shot 500 of FIG. 5, the GUI displays a task bar at the lower right-side of the screen. The task bar includes user-selectable functions that implement the service request processing functionality.

Figure 6:
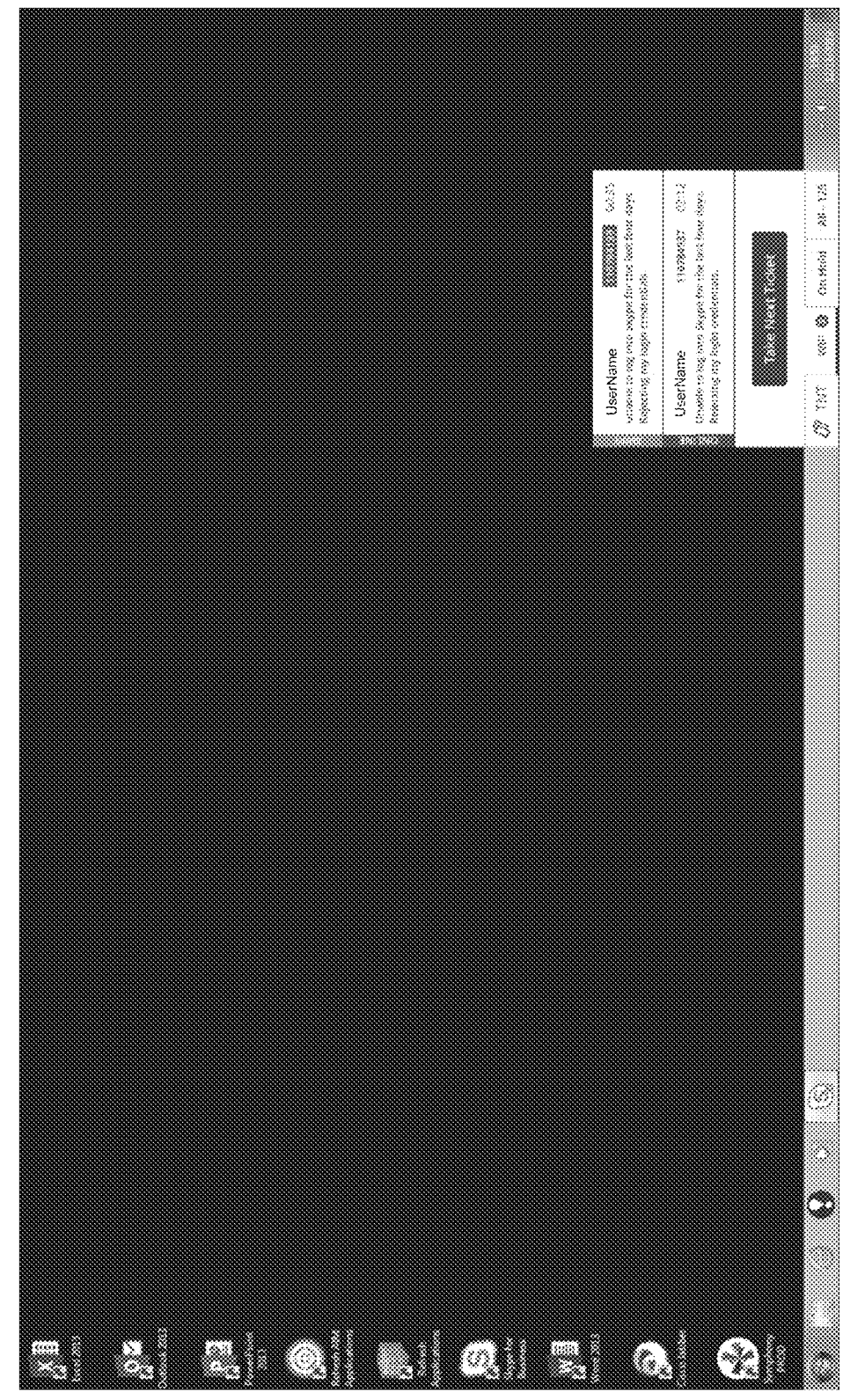
FIG. 6 is a second screen shot of a graphical user interface that facilitates an execution of an exemplary method for expediting the prioritization and processing of service requests in order to reduce response time and increase efficiency in problem resolution.

FIG. 6 is a second screen shot 600 of a GUI that facilitates an execution of an exemplary method for expediting the prioritization and processing of service requests in order to reduce response time and increase efficiency in problem resolution. In the screen shot 600 of FIG. 6, a pair of newly received service requests (also referred to herein as "tickets") is displayed on the GUI, and each newly received ticket includes a name of a user that originated the ticket, a user status (e.g., "AWAY" or "ONLINE"), a ticket identification number, an elapsed amount of time since the ticket was originated, and a brief description of the problem to which the ticket pertains. A clickable button labeled "Take Next Ticket" is also available to enable a user to view an additional ticket.

Figure 7:
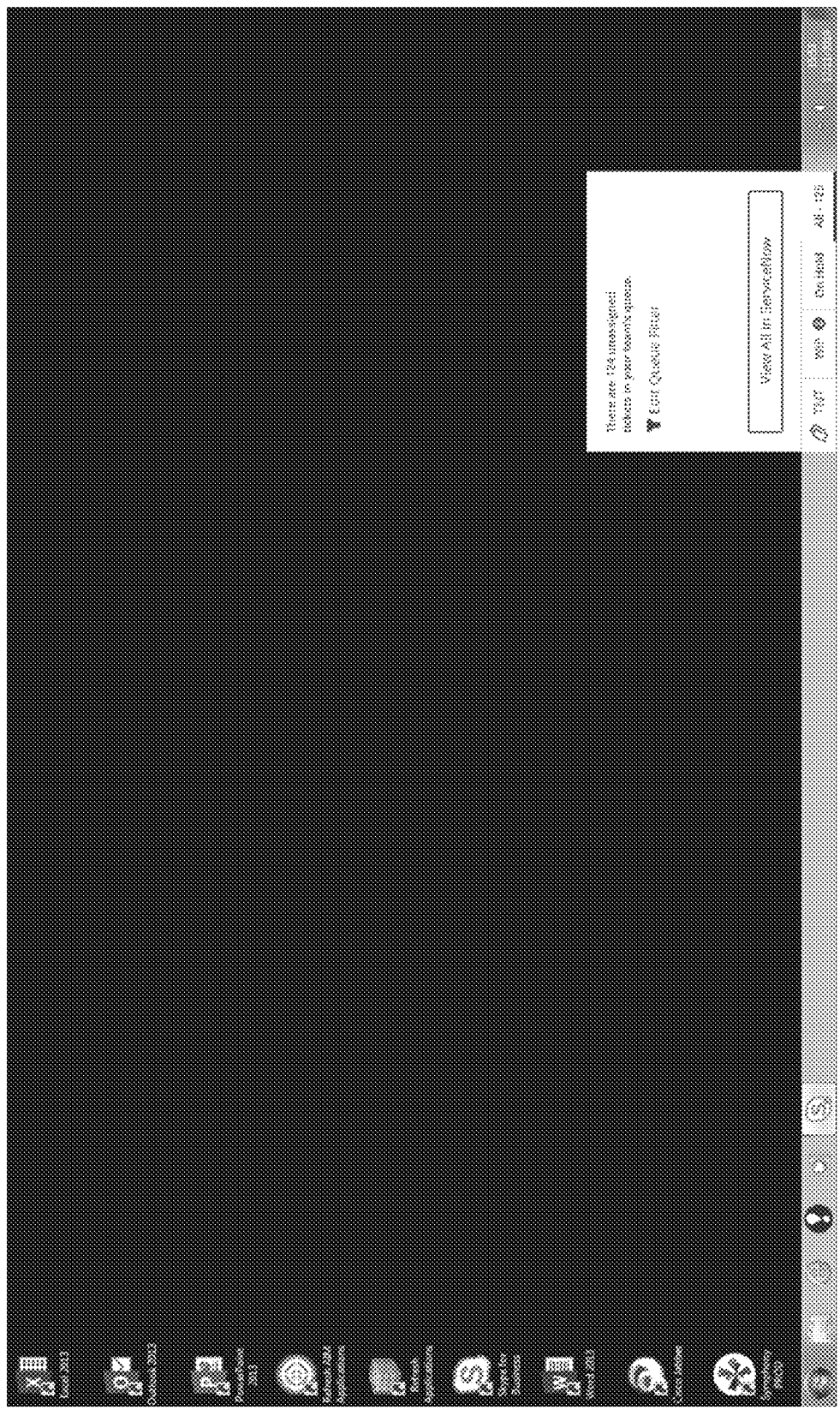
FIG. 7 is a third screen shot of a graphical user interface that facilitates an execution of an exemplary method for expediting the prioritization and processing of service requests in order to reduce response time and increase efficiency in problem resolution.

FIG. 7 is a third screen shot 700 of a GUI that facilitates an execution of an exemplary method for expediting the prioritization and processing of service requests in order to reduce response time and increase efficiency in problem resolution. In the screen shot 700 of FIG. 7, a window displays a number of unassigned tickets in a particular queue that corresponds to a team of ticket handlers, and an "Edit Queue Filter" function is available to enable the ticket handler to apply a filter to the list of tickets. Another clickable button labeled "View All in ServiceNow" enables the ticket handler to view all unassigned tickets.

Figure 8:
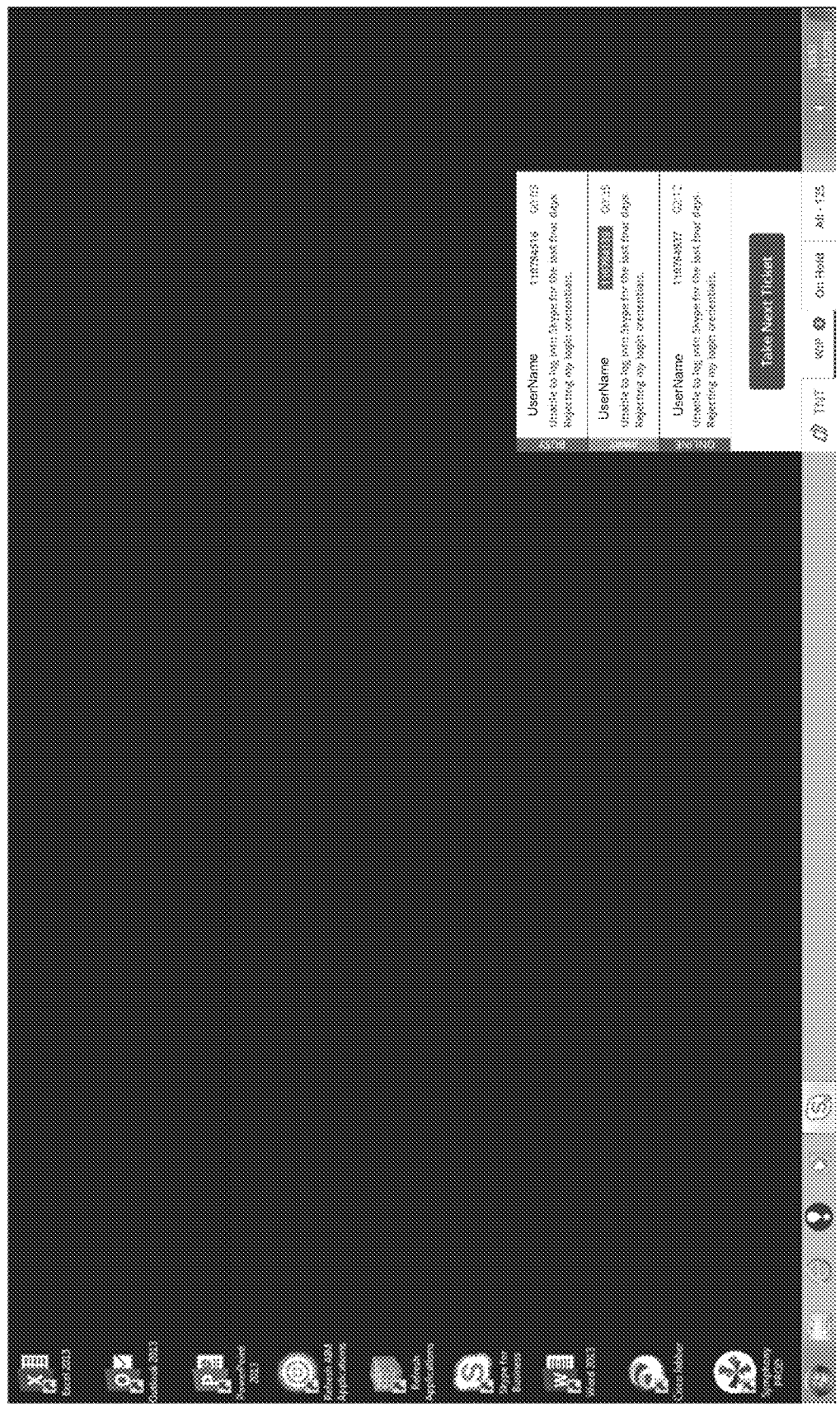
FIG. 8 is a fourth screen shot of a graphical user interface that facilitates an execution of an exemplary method for expediting the prioritization and processing of service requests in order to reduce response time and increase efficiency in problem resolution.

FIG. 8 is a fourth screen shot 800 of a GUI that facilitates an execution of an exemplary method for expediting the prioritization and processing of service requests in order to reduce response time and increase efficiency in problem resolution. In the screen shot 800 of FIG. 8, the same two tickets shown in FIG. 6 are shown together with a newly received third ticket, which includes the name of a user that originated that ticket, the user status (i.e., "BUSY"), a ticket identification number, an elapsed amount of time since the ticket was originated, and a brief description of the problem to which the ticket pertains.

Figure 9:
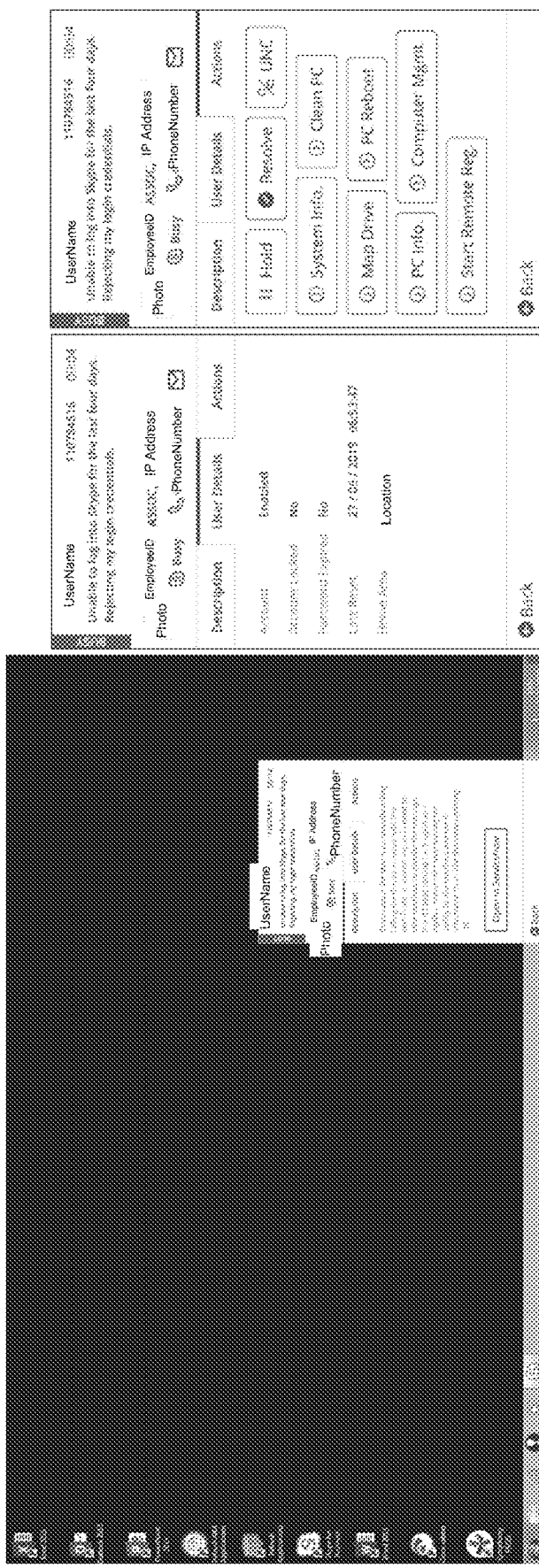
FIG. 9 is a fifth screen shot of a graphical user interface that facilitates an execution of an exemplary method for expediting the prioritization and processing of service requests in order to reduce response time and increase efficiency in problem resolution.

FIG. 9 is a fifth screen shot 900 of a GUI that facilitates an execution of an exemplary method for expediting the prioritization and processing of service requests in order to reduce response time and increase efficiency in problem resolution. In the screen shot 900 of FIG. 9, the newly received third ticket of FIG. 8 has been opened by the ticket handler, resulting in the opening of two new windows as shown on the right side of the drawing figure. The first window displays a set of user-specific details that pertain to the user that originated the ticket. The second window display a set of actions that are available to the ticket handler as clickable buttons.

In an exemplary embodiment, a process for expediting the prioritization and processing of service requests in order to reduce response time and increase efficiency in problem resolution may implement a set of instructions that corresponds to a set of pseudocode as set forth below. The set of pseudocode references Table 1, labeled "Weightings," that includes parameter descriptions, parameter types, weighting values, and comments for each of a set of parameters:

```
Employee Action
  I have a problem and raise a ticket.
    Processing
      The ticket received into the system, assessed and weighted.
      Depending on their location, it is added to the queue of a
particular team.
      Run PROGRAM ProcessTicket
    Technician Action
      I need to take the highest priority ticket, taking my specialisms into
account.
      Run PROGRAM AcceptNextTicket
    PROGRAM ProcessTicket
    use = 'name'
    weightings.descriptions = description_1, description_2, description_3
    weightings.values = 100, 50, 5
    userLocation = London
    Agreement = Standard
    TimeZone = GMT
      Run function CalculateUserPriority
      Run function AssignToTeam
      Function CalculateUserPriority
        UserPriority = 0
        Pass In: weightings
          FOR every weighting type
            Add the highest value to the
UserPriority
          ENDFOR
        Pass Out: UserPriority
      Endfunction
      Function AssignToTeam
        Pass In: userLocation, Agreement, TimeZone
          Calculate the appropriate team to assign to
        Pass Out: TeamQueue
      Endfunction
    END
    PROGRAM .AcceptNextTicket
    TechnicianSkillset = Mobility Skillset
    Call function CheckTickets
      Function CheekTickets
        Pass In: TechnicianSkillset
          PRECONDITION: TicketAccepted is false
          WHILE TicketAccepted is false
            Check  the  tickets  from  my
prioritised TeamQueue from top down
            IF    ticket    tags
match TechnicianSkillset AND AffectedUser has only this ticket THEN
              NextTicket is this ticket
              TicketAccepted is true
            ELSE IF  ticket   tags
match TechnicianSkillset AND AffectedUser has multiple unassigned tickets THEN
              NextTicket(s)  are   all
AffectedUser's tickets
              TicketAccepted is true
            END IF
          ENDWHILE
```

```
    Pass Out: NextTicket(s)
  Endfunction
END
```

TABLE 1

Weightings

| Descriptions | Type | Values | Comments |
| --- | --- | --- | --- |
| VIP - CWS | VIP | 1000 | VIP Name -4 |
| Enhanced - CWS | Support Agreement | 600 | Enhanced Customers |
| Out of Hours - CWS | Raised out of hours | 60 | Raise Out of hours- Currently disabled until bug fix |
| Reopen - CWS | Reopen | 60 | Reopen Tickets |
| #VDI Migration | Tagged Incident | 55 | Migration user manual input list - rolling 2 week life span |
| New Hire - CWS | New Hire | 55 | New Hire - 4 weeks based on start date |
| AWM Standard - CWS | Support Agreement | 51 | AWM Standard LOB |
| Aged 20+ Days - CWS | Aged Ticket | 45 | 20 days or more aged 20 days or more |
| Aged 10+ Days - CWS | Aged Ticket | 40 | 10 days or more aged 20 days or more |
| Aged 5+ Days - CWS | Aged Ticket | 30 | 5 days or more aged 20 days or more |
| Aged 4+ Days - CWS | Aged Ticket | 20 | 4 days or more aged 20 days or more |
| Update Count - 6 | Updated by Caller | 20 | Ticket update count is 6 or greater |
| Update Count - 5 | Updated by Caller | 15 | Ticket update count is 5 or greater |
| Aged 3+ Days - CWS | Aged Ticket | 10 | 3 days or more aged 20 days or more |
| Update Count - 4 | Updated by Caller | 10 | Ticket update count is 4 or greater |
| User Update | Updated by Caller | 5 | User has requested an update for their ticket |
| Update Count - 3 | Updated by Caller | 5 | Ticket update count is 3 or greater |

Note:
Each type category will not accumulate it will take the highest weight and apply that. Accumulation of weight will occur for each weight type
e.g. a ticket that is 10 days old will get a weight of 40 for update by Aged Ticket type and not 100 if accurmthiting and 3/4/5/10 together Accordingly, with this technology, an optimized process for expediting the prioritization and processing of service requests in order to reduce response time and increase efficiency in problem resolution is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed, rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for facilitating a processing of a service request, the method being implemented by at least one processor, the method comprising:

accessing, by the at least one processor, a plurality of previously received service requests;

receiving, by the at least one processor, a first new service request;

determining, by the at least one processor, a handling protocol for the first new service request;

adding the received first new service request to the plurality of previously received service requests to generate an updated list of open service requests; and displaying, via a graphical user interface, a listing of a least a subset of the updated list of open service requests, wherein the handling protocol includes a priority ranking of the first new service request and an identification of at least one technician that is proposed for resolving a problem that relates to the first new service request, and wherein the determining of the handling protocol for the first new service request comprises:

assigning a respective weight to each of a plurality of predetermined parameters with respect to the first new service request; and combining the assigned weights to obtain an overall priority score.

2. The method of claim 1, wherein the combining of the assigned weights comprises applying an algorithm to the assigned weights and obtaining the overall priority score as an output of the applying of the algorithm.

3. The method of claim 2, wherein the algorithm is trained by using a machine learning technique with respect to historical service request handling data.

4. The method of claim 1, wherein the determining of the handling protocol further comprises determining the identification of the at least one technician that is proposed for resolving the problem based at least in part on a geographical location of the technician with respect to a geographic location of an origination source of the first new service request.

5. The method of claim 4, wherein the at least one technician includes at least two technicians that are proposed for solving the problem, and wherein the handling protocol includes an ordered list of the at least two technicians that indicates which of the at least two technicians is a first choice and which of the at least two technicians is a second choice.

6. The method of claim 1, wherein the displaying of the listing of a least a subset of the updated list of open service requests comprises displaying, for each item in the updated list, information that relates to a priority of the item, an elapsed amount of time since the item was originally received, a description of a problem, and a user name that relates to an origination source of the item.

7. The method of claim 1, further comprising receiving, via the graphical user interface, a user input for requesting information that relates to an origination source of a selected item, the service request, and displaying, on the graphical user interface, information that relates to a user name that relates to the origination source of the selected item, contact information that relates to the origination source of the selected item, and a description of a problem that relates to the selected item.

8. The method of claim 7, further comprising displaying, on the graphical user interface, a user status that relates to the origination source of the selected item, wherein the user status includes at least one from among an online status, an away status, and a busy status.

9. The method of claim 1, further comprising displaying, on the graphical user interface, a message that indicates a number of unassigned service requests in a queue that corresponds to a predetermined team of technicians.

10. A computing apparatus for facilitating a processing of a service request, the computing apparatus comprising:
   a processor;
   a memory; and
   a communication interface coupled to each of the processor and the memory,
   wherein the processor is configured to:
      access a plurality of previously received service requests;
      receive, via the communication interface, a first new service request;
      determine a handling protocol for the first new service request;
      add the received first new service request to the plurality of previously received service requests to generate an updated list of open service requests; and
      display, via a graphical user interface, a listing of a least a subset of the updated list of open service requests,
   wherein the handling protocol includes a priority ranking of the first new service request and an identification of at least one technician that is proposed for resolving a problem that relates to the first new service request,
   wherein the processor is further configured to determine the handling protocol for the first new service request by:
      assigning a respective weight to each of a plurality of predetermined parameters with respect to the first new service request; and
      combining the assigned weights to obtain an overall priority score.

11. The computing apparatus of claim 10, wherein the processor is further configured to apply an algorithm to the assigned weights and to obtain the overall priority score as an output of the algorithm.

12. The computing apparatus of claim 11, wherein the algorithm is trained by using a machine learning technique with respect to historical service request handling data.

13. The computing apparatus of claim 10, wherein the processor is further configured to determine the identification of the at least one technician that is proposed for resolving the problem based at least in part on a geographical location of the technician with respect to a geographic location of an origination source of the first new service request.

14. The computing apparatus of claim 13, wherein the at least one technician includes at least two technicians that are proposed for solving the problem, and wherein the handling protocol includes an ordered list of the at least two technicians that indicates which of the at least two technicians is a first choice and which of the at least two technicians is a second choice.

15. The computing apparatus of claim 10, wherein the processor is further configured to display, on the graphical user interface, for each item in the updated list, information that relates to a priority of the item, an elapsed amount of time since the item was originally received, a description of a problem, and a user name that relates to an origination source of the item.

16. The computing apparatus of claim 10, wherein the processor is further configured to receive, via the graphical user interface, a user input for requesting information that relates to an origination source of a selected item, the service request, and to display, on the user interface, information that relates to a user name that relates to the origination source of the selected item, contact information that relates to the origination source of the selected item, and a description of a problem that relates to the selected item.

17. The computing apparatus of claim 16, wherein the processor is further configured to display, on the graphical user interface, a user status that relates to the origination source of the selected item, wherein the user status includes at least one from among an online status, an away status, and a busy status.

18. The computing apparatus of claim 10, wherein the processor is further configured to display, on the graphical user interface, a message that indicates a number of unassigned service requests in a queue that corresponds to a predetermined team of technicians.

* * * * *